US012791169B2

(12) United States Patent
Koo

(10) Patent No.: US 12,791,169 B2
(45) Date of Patent: Nov. 10, 2026

(54) FIXING DEVICE FOR VEHICLE ELECTRONICS USING MULTIPLE SIDE RAILS

(71) Applicant: MABA INDUSTRIAL CO., LTD, Ulsan (KR)

(72) Inventor: Hyo Jeong Koo, Seoul (KR)

(73) Assignee: MABA INDUSTRIAL CO., LTD, Ulsan (KR)

( * ) Notice: Subject to any disclaimer, the term of this patent is extended or adjusted under 35 U.S.C. 154(b) by 0 days.

(21) Appl. No.: 19/293,958

(22) Filed: Aug. 7, 2025

(65) Prior Publication Data

US 2026/0043534 A1 Feb. 12, 2026

(30) Foreign Application Priority Data

Aug. 9, 2024 (KR) ........................ 10-2024-0107073
Nov. 21, 2024 (KR) ........................ 10-2024-0166913

(51) Int. Cl.
*F21V 19/00* (2006.01)
*B60Q 3/53* (2017.01)
(Continued)

(52) U.S. Cl.
CPC ............ *F21V 19/0025* (2013.01); *B60Q 3/53* (2017.02); *B60Q 3/88* (2017.02); *F21S 4/28* (2016.01);
(Continued)

(58) Field of Classification Search
CPC ......... F21V 19/0025; B60Q 3/53; B60Q 3/88; F21S 4/28; F21W 2106/00; F21Y 2103/10; F21Y 2113/17; F21Y 2115/10
See application file for complete search history.

(56) References Cited

U.S. PATENT DOCUMENTS 5,180,089 A * 1/1993 Suman ..................... B60N 3/00 296/153
11,146,019 B1 * 10/2021 Hunnicutt ............ H01R 25/142
(Continued)

FOREIGN PATENT DOCUMENTS

FR 3122374 A1 * 11/2022 ......... B60R 11/0241
JP 2005349978 A 12/2005
(Continued)

OTHER PUBLICATIONS

Notice of Submission of Opinion received in the Korean patent Application No. 10-2024-0166913, dated Apr. 21, 2026. 14 Pages including English translation.

*Primary Examiner* — Christle I Marshall
(74) *Attorney, Agent, or Firm* — AEON Law, PLLC; Adam L.K. Philipp; Ki Yong O

(57) ABSTRACT

A fixing device for vehicle electronics includes multiple side rails arranged in parallel along an interior surface of a vehicle, each movable between a hidden state flush with the interior and a protruded state extending outward. Each side rail includes a body part configured to receive a fixing member of an electronic device, an electrode that supplies voltage to the fixing member upon contact, and an LED bar that displays a color indicating the supplied voltage. An electronic device is mechanically secured between two protruded side rails and electrically powered by the potential difference between the voltages applied to their respective electrodes. By selectively protruding different combinations of side rails, the device accommodates electronics of varying sizes while simultaneously providing stable fixation and operating power, with a voltage setting processor and adjustment switches enabling per-rail voltage control.

10 Claims, 10 Drawing Sheets

(51) Int. Cl.

| | |
|---|---|
| ***B60Q 3/88*** | (2017.01) |
| ***F21S 4/28*** | (2016.01) |
| *F21W 106/00* | (2018.01) |
| *F21Y 103/10* | (2016.01) |
| *F21Y 113/17* | (2016.01) |
| *F21Y 115/10* | (2016.01) |

(52) U.S. Cl.
CPC ...... *F21W 2106/00* (2018.01); *F21Y 2103/10* (2016.08); *F21Y 2113/17* (2016.08); *F21Y 2115/10* (2016.08)

(56) References Cited

U.S. PATENT DOCUMENTS

| | | | | |
|---|---|---|---|---|
| 12,221,069 | B2 * | 2/2025 | Allio | B60R 7/06 |
| 12,291,156 | B2 * | 5/2025 | Miyoshi | B60R 16/03 |
| 2005/0127122 | A1 * | 6/2005 | McKenzie | B60R 11/02<br>224/547 |

FOREIGN PATENT DOCUMENTS

| | | | | | |
|---|---|---|---|---|---|
| JP | 2016509356 | A | | 3/2016 | |
| JP | 2021094999 | A | * | 6/2021 | |
| JP | 2024064750 | A | * | 5/2024 | |
| KR | 101392505 | B1 | * | 5/2014 | |
| KR | 101563058 | B1 | | 10/2015 | |
| KR | 20180005922 | A | | 1/2018 | |
| WO | WO-2014049072 | A1 | * | 4/2014 | B64D 11/0015 |

* cited by examiner

FIXING DEVICE FOR VEHICLE ELECTRONICS USING MULTIPLE SIDE RAILS

CROSS-REFERENCE TO RELATED APPLICATION

This application claims priority under 35 U.S. C § 119 to Korean Patent Application No. 10-2024-0166913 filed on Nov. 21, 2024 and Korean Patent Application No. 10-2024-0107073 filed on Aug. 9, 2024, in the Korean Intellectual Property Office, the entire contents of which are hereby incorporated by reference.

TECHNICAL FIELD

The present disclosure relates to a fixing device for vehicle electronics. Specifically, the present disclosure relates to a fixing device capable of simultaneously providing power supply and fixation for vehicle electronics by using multiple side rails.

Explanation on state-supported research and development. This study was conducted under the management of the Korea Evaluation Institute of Industrial Technology and with the support of the "Development of Multipurpose Mobility (PVB) Cabin Design Technology" (Project Identification Number: 1415181143) of the Design Industry Technology Development Project of the Ministry of Trade, Industry and Energy.

BACKGROUND

The content described in this section is merely provided as background information for the present embodiment and does not constitute conventional art.

With the advent of the Fourth Industrial Revolution, the concept of vehicles (mobility) is changing, particularly from "ownership" to "use" or "sharing," and the related market and related services associated therewith are experiencing explosive growth.

In particular, since multiple users may use a shared vehicle for various purposes, development of purpose built vehicles (PBVs) for satisfying various changes in mobility purposes and diverse user needs is actively being conducted.

A purpose built vehicle may include displays of various types and characteristics (such as PDLC, flexible displays, transparent displays, projectors, etc.) arranged inside and outside the vehicle. Compared to conventional analog information indicators, a purpose built vehicle may be controlled to provide more diverse information according to driving purposes and situations. Furthermore, a purpose built vehicle may be configured to allow various electronic devices to be used therein, thereby supporting fulfillment and achievement of more diverse user purposes.

However, when electronic devices are used inside the vehicle, power supply for operating the electronic devices and secure fixation of the electronic devices are required.

SUMMARY

An object of the present disclosure is to provide a power supply and fixing device for vehicle electronics using multiple side rails, which may support power supply and stable fixation of vehicle electronics used inside a vehicle.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

According to some aspects of the disclosure, a fixing device for vehicle electronics comprises a first side rail located in an interior space of a vehicle and to which a first voltage is provided; and a second side rail located in the interior space of the vehicle spaced apart from the first side rail and to which a second voltage different from the first voltage is provided, wherein the first side rail and the second side rail are arranged in parallel in one direction, the first side rail includes a first body part to which a first fixing member of a first electronic device is physically fixed and a first electrode to which the first voltage is provided, the second side rail includes a second body part to which a second fixing member of the first electronic device is physically fixed and a second electrode to which the second voltage is provided, the first fixing member comes into contact with the first electrode when fixed to the first body part, the second fixing member comes into contact with the second electrode when fixed to the second body part, the first fixing member and the second fixing member include a conductive material, and the first electronic device is operated based on a potential difference between the first voltage and the second voltage.

According to some aspects, the first side rail and the second side rail are accommodated in the interior space of the vehicle so as not to protrude in an unused state, and the first side rail and the second side rail are moved to protrude from the interior space of the vehicle in a usage state for fixing with the electronic device and supplying power to the electronic device to expose the first body part and the second body part to the outside.

According to some aspects, the first side rail further includes a first LED bar extending along a longitudinal direction of the first side rail, the second side rail further includes a second LED bar extending along a longitudinal direction of the second side rail, the first LED bar and the second LED bar are controlled to display a color or pattern similar to that of the interior space of the vehicle in the unused state, the first LED bar displays a first color corresponding to the first voltage in the usage state, and the second LED bar displays a second color corresponding to the second voltage in the usage state.

According to some aspects, further comprising a third side rail located around the first side rail or the second side rail, wherein the first side rail, the second side rail, and the third side rail are arranged in parallel in one direction.

According to some aspects, as the third side rail is moved to protrude, a third voltage is provided to a third electrode of the third side rail, a first fixing member of a second electronic device having a size different from the first electronic device is physically fixed to a third body part of the third side rail and comes into contact with the third electrode, a second fixing member of the second electronic device is physically fixed to a second body part of the second side rail and comes into contact with the second electrode, and the second electronic device is operated based on a potential difference between the third voltage and the second voltage while being coupled to the third side rail and the second side rail.

According to some aspects, further comprising a voltage setting processor that provides the first voltage to the first side rail and provides the second voltage to the second side rail.

According to some aspects, the voltage setting processor sets the first voltage to the first electrode in response to the protruding movement of the first side rail and sets the second voltage to the second electrode in response to the protruding movement of the second side rail.

According to some aspects, the first side rail further includes a first adjustment switch that controls electrical connection with the voltage setting processor, the second side rail further includes a second adjustment switch that controls electrical connection with the voltage setting processor, a voltage set to the first electrode of the first side rail is changed according to an operation of the first adjustment switch, and a voltage set to the second electrode of the second side rail is changed according to an operation of the second adjustment switch.

According to some aspects, the electronic device further comprises an elastic member disposed between the first fixing member and the second fixing member, and the first fixing member and the second fixing member receive the first side rail and the second side rail in a state in which a distance therebetween is temporarily increased by the elastic member, and are respectively coupled to the first body part of the first side rail and the second body part of the second side rail by a restoring force of the elastic member.

According to some aspects, the first body part of the first side rail and the second body part of the second side rail include both an upper coupling groove formed on an upper portion and a lower coupling groove formed on a lower portion, the first electrode is arranged to cover the upper coupling groove and the lower coupling groove of the first body part, and the second electrode is arranged to cover the upper coupling groove and the lower coupling groove of the second body part.

The fixing device for vehicle electronics using multiple side rails according to an embodiment of the present disclosure may provide operation power to the vehicle electronics while stably fixing the vehicle electronics through the multiple side rails.

In addition, the fixing device for vehicle electronics using multiple side rails according to an embodiment of the present disclosure may support selective fixation of vehicle electronics of various sizes by selectively using the multiple side rails.

Further, the fixing device for vehicle electronics using multiple side rails according to an embodiment of the present disclosure may support a user in checking an operation state of the fixing device by displaying the operation state through an LED bar, thereby supporting safe use.

Furthermore, the fixing device for vehicle electronics using multiple side rails according to an embodiment of the present disclosure may support easy setting of power supplied to each side rail through an external operation switch.

In addition to the contents described above, specific effects of the present disclosure will be described together while describing the following specific details for carrying out the present disclosure.

DETAILED DESCRIPTION OF THE PREFERRED EMBODIMENTS

Figure 1:
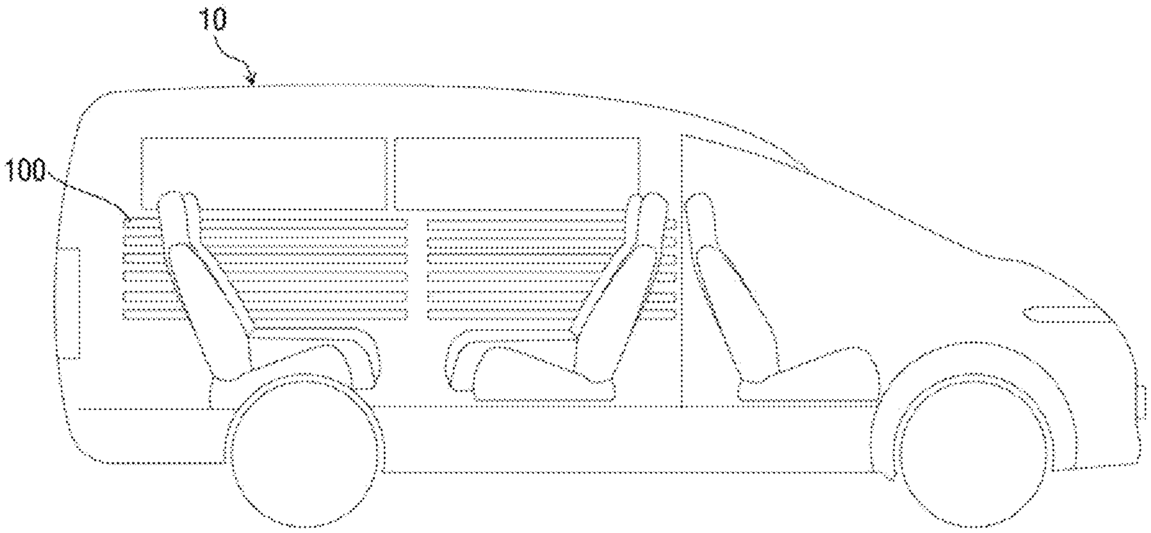
FIG. 1 is an exemplary diagram illustrating a vehicle according to some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, with reference to FIGS. 1 to 10, a fixing device for vehicle electronics using multiple side rails according to an embodiment of the present disclosure will be described.

Figure 2:
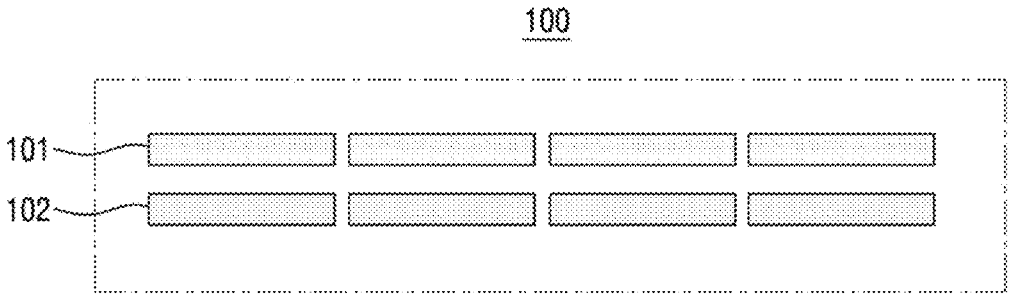
FIG. 2 is an exemplary diagram of a fixing device for vehicle electronics according to an embodiment of the present disclosure, applied to the vehicle of FIG. 1.
Figure 3:
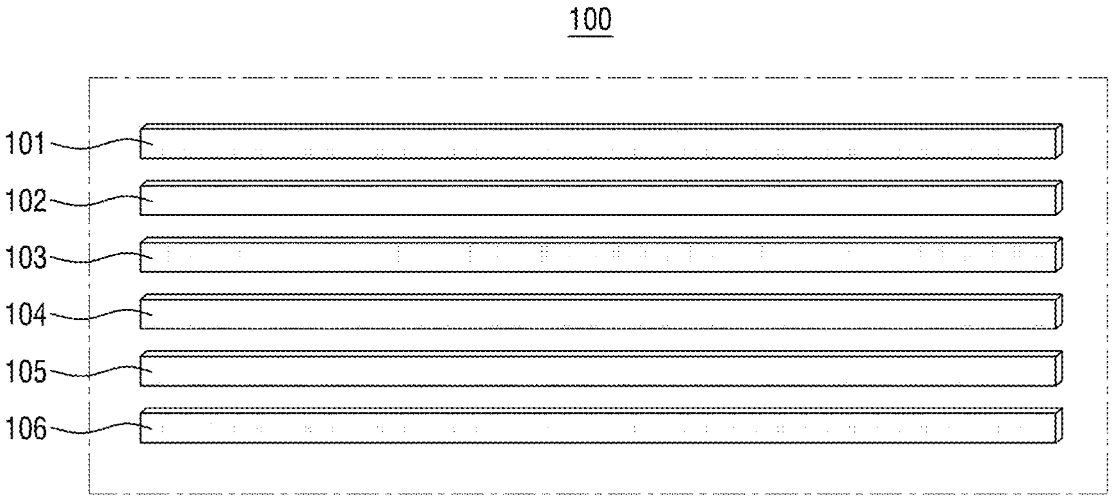
FIG. 3 is a diagram exemplary illustrating a state in which the fixing device of FIG. 2 is protruded.
Figure 4:
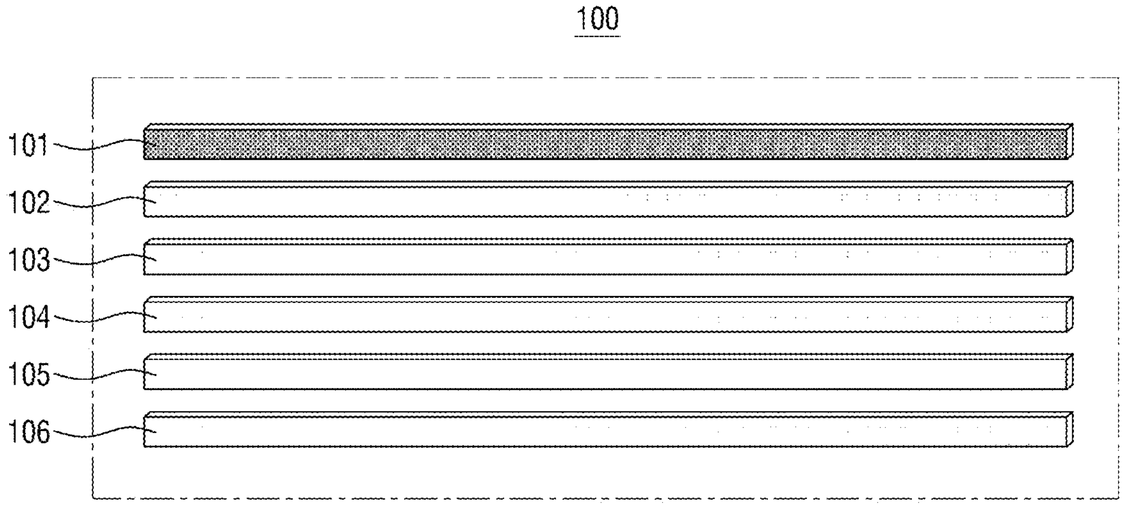
FIG. 4 is a diagram exemplary illustrating an external shape change in a state where power is supplied to the fixing device of FIG. 2.
Figure 5:
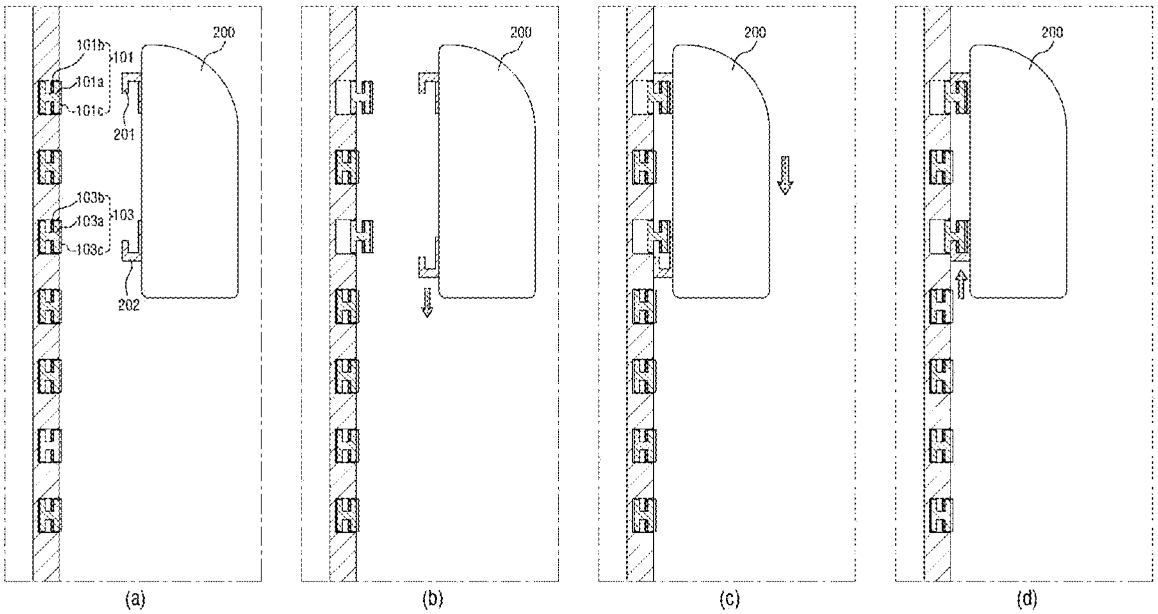
FIG. 5 is an exemplary diagram illustrating a process in which vehicle electronics is coupled and fixed to the fixing device according to an embodiment of the present disclosure.
Figure 6:
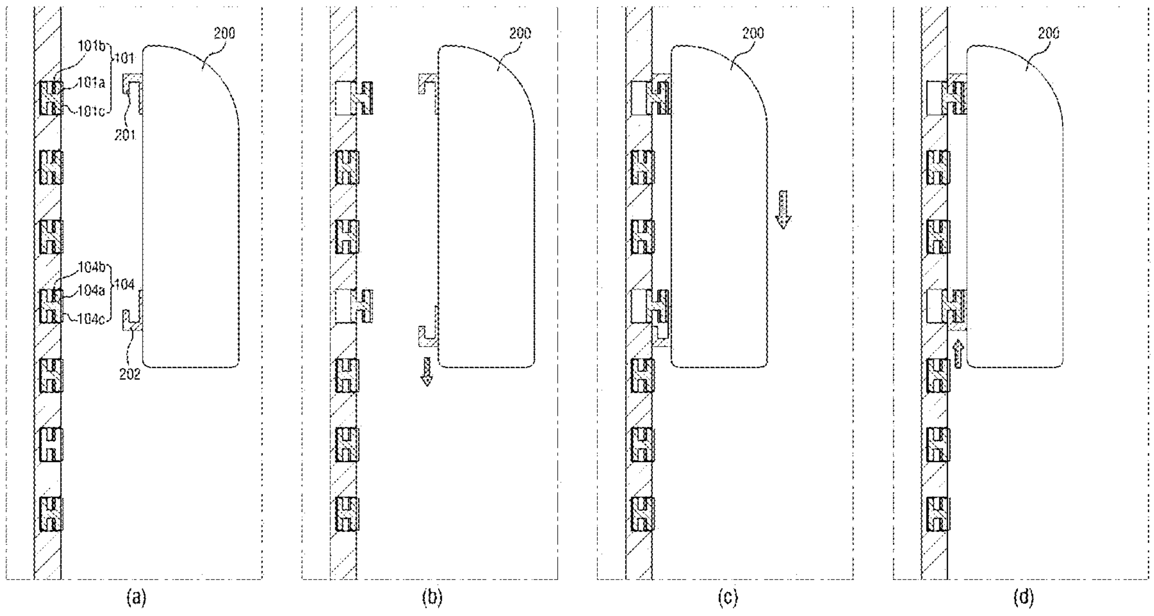
FIG. 6 is an exemplary diagram illustrating a process in which vehicle electronics larger in size than that of FIG. 5 is coupled and fixed to the fixing device according to an embodiment of the present disclosure.

FIG. 1 is an exemplary diagram illustrating a vehicle according to some embodiments of the present disclosure. FIG. 2 is an exemplary diagram of a fixing device for vehicle electronics according to an embodiment of the present disclosure, applied to the vehicle of FIG. 1. FIG. 3 is a diagram exemplary illustrating a state in which the fixing device of FIG. 2 is protruded. FIG. 4 is a diagram exemplary illustrating an external shape change in a state where power is supplied to the fixing device of FIG. 2. FIG. 5 is an exemplary diagram illustrating a process in which vehicle electronics is coupled and fixed to the fixing device according to an embodiment of the present disclosure. FIG. 6 is an exemplary diagram illustrating a process in which vehicle electronics larger in size than that of FIG. 5 is coupled and fixed to the fixing device according to an embodiment of the present disclosure. FIGS. 7 to 10 are exemplary diagrams for explaining an operation of a voltage setting processor according to an embodiment of the present disclosure.

Referring to FIG. 1, a vehicle 10 may provide various services that correspond to different purposes, along with the basic driving function of the vehicle. The vehicle 10 may be a purpose built vehicle (PBV) that provides functions corresponding to the user's purposes and demands. The vehicle 10 may refer to a multiple purpose vehicle (MPV) that can be used for various purposes. The vehicle 10 may have an internal and external configuration that can be freely changed to provide such multi-purpose services. In order to provide various services to passengers, various components (seats, storage devices, electronic devices, etc.) may be arranged in the interior space of the vehicle 10. The vehicle 10 may provide electronic devices that correspond to various purposes. The vehicle 10 may provide power required for operating the electronic devices and a fixing member for safely operating the electronic devices.

The fixing device 100 (hereinafter referred to as "fixing device") for vehicle electronics according to an embodiment of the present disclosure may be located inside the vehicle 10. FIG. 1 exemplarily illustrates a case in which the fixing device 100 is located on an inner side below a window of the vehicle 10, but the embodiment of the present disclosure is not limited thereto. The fixing device 100 may be located and arranged on various internal components of the vehicle 10, such as a rear side of a seat, both side surfaces, or a trunk door.

The fixing device 100 may be configured with multiple side rails, and may support stable coupling and fixation of various electronic devices inside the vehicle 10 through coupling with the side rails. The fixing device 100 may be a power supply device that supplies power to the electronic device in the coupled state.

Referring to FIG. 2, the fixing device 100 may include multiple side rails arranged along an inner wall of the vehicle. Exemplarily, the multiple side rails may include a first side rail 101 to a sixth side rail 106. The number, length, and width of the side rails are merely exemplary, and the embodiment of the present disclosure is not limited thereto. The first to sixth side rails 101 to 106 may have a shape extending in a first direction, and may be arranged in parallel at regular intervals in a second direction perpendicular to the first direction. The first to sixth side rails 101 to 106 may have different lengths depending on the space in which they are arranged. However, the width of each side rail and the arrangement interval with an adjacent side rail may be identical.

In FIG. 2, the first to sixth side rails 101 to 106 are in a state not protruded from the internal component of the vehicle 10. When in an unused state, the first to sixth side rails 101 to 106 may be hidden within the internal component of the vehicle 10. An outer surface (a surface exposed outward) of the first to sixth side rails 101 to 106 may have the same color or pattern as the internal component of the vehicle 10. Accordingly, in the hidden state (non-protruding state), the first to sixth side rails 101 to 106 may be recognized as being substantially the same as the internal component of the vehicle 10, and thus may not impair the internal design or aesthetics of the vehicle 10.

The first to sixth side rails 101 to 106 are in a state inserted into a preconfigured internal component of the vehicle. An elastic member may be in a compressed state between the side rails and the internal component of the vehicle. The elastic member may provide a restoring force that protrudes the side rails outward, but the first to sixth side rails may remain in the inserted state in the internal component of the vehicle through coupling between the first to sixth side rails and the internal component of the vehicle. However, the coupling between the first to sixth side rails and the internal component of the vehicle may be released by a user's operation. In such a state, the restoring force by the elastic member may act such that the first to sixth side rails are moved to protrude outward from the internal component of the vehicle.

As shown in FIG. 3, the first to sixth side rails 101 to 106 may be moved to protrude by a user's operation. Exemplarily, in response to a user's push operation on a side rail, the fixed and coupled state between the internal component and the side rail may be released, and the side rail may be moved outward by a restoring force of the elastic member. The first to sixth side rails 101 to 106 may maintain a state of being protruded from the internal component of the vehicle 10, and may provide fixing force in the protruded state.

The protrusion of the first to sixth side rails 101 to 106 may be individually performed in response to a user's operation. As exemplified in FIG. 3, all the side rails 101 to 106 may be protruded, but only specific side rails may be protruded and switched to a usable state. However, the embodiment of the present disclosure is not limited thereto, and the protrusion of the first to sixth side rails 101 to 106 may also be controlled by a movement controller (not shown) in consideration of the positions of the corresponding fixing members.

In addition, the side rail according to an embodiment of the present disclosure may further provide a function of supplying operation power in addition to the fixing function. Referring to FIG. 4, the first side rail 101 and the fifth side rail 105 may be in a state in which power is supplied. An external display capable of changing colors may be arranged on an outer surface of the side rail, and may display a color change in response to the supplied voltage. That is, the first side rail 101 and the fifth side rail 105 may be in a state in which different voltages are formed. Through such color change and color display, it may be supported that a user inside the vehicle 10 easily checks a state in which a specific side rail is operating and a voltage state currently being provided.

To ensure that the electronic device operates stably inside the vehicle, stable coupling is required. The fixing device 100 according to an embodiment of the present disclosure may fix and couple an electronic device by simultaneously protruding a pair of side rails, rather than only one side rail, in order to ensure that stable coupling is maintained. Here, the fixing device 100 provides power supply, and transmission of video/audio signals, control signals, and the like may be performed by other means. For example, electrical connection using another cable or connection using a wireless method may be used.

FIG. 5 is an exemplary diagram for explaining a process of coupling the electronic device 200 to the fixing device 100. The first side rail 101 and the third side rail 103 may be protruded to couple with the electronic device 200. Fixing members 201 and 202 may be provided on a surface of the electronic device 200 that is unrelated to operation. Here, the surface unrelated to operation may typically refer to a rear surface of the electronic device 200. That is, the fixing members 201 and 202 may be configured on a surface where buttons, screens, and components related to operation are not exposed to the outside. The fixing member may be configured as a pair, and may include a first fixing member 201 and a second fixing member 202. The first fixing member 201 and the second fixing member 202 may be provided on the electronic device 200 in consideration of the size and weight of the electronic device 200.

FIG. 5(*a*) exemplarily illustrates a state in which the electronic device 200 is being prepared to be coupled to the fixing device 100. Referring to FIG. 5(*a*), it can be seen that all the side rails of the fixing device 100 are in a non-protruding state, that is, in a hidden state. The electronic device 200 may be positioned such that the first fixing member 201 and the second fixing member 202 face the fixing device 100.

Referring to FIG. 5(*b*), a first side rail 101 and a third side rail 103 may be protruded to be coupled with the first fixing member 201 and the second fixing member 202. Each of the side rails may include an LED bar, a body part, and an electrode. In a usage state for fixing the electronic device and supplying power to the electronic device, the side rail may be moved to protrude from the interior space of the vehicle, thereby exposing the body part and the electrode. The LED bar may be exposed to the outside even in a non-usage state, and the body part and the electrode may be exposed to the outside in a usage state.

In addition, in some embodiments, the side rail may include a sensor that recognizes the fixing member and generates recognition information, and a body movement controller that moves the body in accordance with the recognition information provided from the sensor. The sensor may generate recognition information that determines coordinates in a three-dimensional space where the first fixing member 201 and the second fixing member 202 are located. The sensor may be configured to include any one of an image sensor, an RGB-D sensor, and a LiDAR sensor, and may identify spatial positions of the first fixing member 201 and the second fixing member 202. The body movement controller may identify two side rails corresponding to the spatial positions of the first fixing member 201 and the second fixing member 202 based on the recognition information, and may control movement of the side rails so that the identified side rails are protruded.

In the example of FIG. 5, it can be seen that the first side rail 101 and the third side rail 103 respectively correspond to the positions of the first fixing member 201 and the second fixing member 202. Accordingly, in FIG. 5(*b*), the first side rail 101 and the third side rail 103 are protruded. Such protrusion of the first side rail 101 and the third side rail 103 may be performed through a user operation or the operation of the above-described sensor and body movement controller.

For easy coupling with the side rails, one of the first fixing member 201 and the second fixing member 202 may be capable of position adjustment. The first fixing member 201 and the second fixing member 202 may be configured so that the distance therebetween is adjustable. An elastic member may be arranged between the first fixing member 201 and the second fixing member 202, and after the distance is temporarily adjusted to increase, the distance therebetween may be adjusted to decrease by the restoring force of the elastic member.

In the example of FIG. 5(*b*), the second fixing member 202 may be moved downward, and a space may be formed between the first fixing member 201 and the second fixing member 202 so that the first side rail 101 and the third side rail 103 are entirely covered.

In FIG. 5(*c*), the first side rail 101 and the third side rail 103 may be received in the space between the first fixing member 201 and the second fixing member 202, and primary coupling between the first fixing member 201 and the first side rail 101 may be performed. A body part of each side rail may include a coupling groove that is open toward both the upper side and the lower side. The body part may have an "H"-shaped structure and may include both an upper coupling groove and a lower coupling groove. The electrode may be arranged to cover both the upper coupling groove and the lower coupling groove. The fixing member may be fixed in the upper coupling groove or the lower coupling groove of the body part. Even when the fixing member is coupled to either the upper coupling groove or the lower coupling groove of the body, electrical connection with the electrode may occur. The fixing member may be seated in the coupling groove, and as the fixing member is seated and received in the coupling groove, coupling between the fixing member and the body part of the side rail may be performed. In FIG. 5(*c*), it can be seen that coupling is performed such that the first fixing member 201 is received in the upper coupling groove of the body part of the first side rail 101.

In FIG. 5(*d*), as the second fixing member 202 moves upward, further coupling between the third side rail 103 and the second fixing member 202 may be performed. The second fixing member 202 may be moved in an upward direction by a restoring force of an elastic member and may be seated and received in a lower coupling groove of the third side rail 103, which is open toward the lower side.

In some embodiments, the body movement controller, after recognizing both the coupling between the first fixing member 201 and the first side rail 101 and the coupling between the second fixing member 202 and the third side rail 103, may perform fine inward movement of the first side rail 101 and the third side rail 103 to move the first fixing member 201 and the second fixing member 202 to be in close contact with the internal component of the vehicle. Through such position adjustment, the coupling between the first fixing member 201 and the first side rail 101 and the coupling between the second fixing member 202 and the third side rail 103 may be maintained more stably.

Here, the electrode may be arranged in the coupling groove of the side rail and may come into contact with the fixing member in the coupled state. The fixing member may be made of a conductive material for electrical connection with the electrode, or may include a conductive contact portion. The fixing member may not only be physically coupled to the coupling groove of the body part, but also may come into contact with the electrode while being coupled in the groove, thereby being electrically connected to the electrode.

A first voltage may be formed at an electrode 101*b* of the first side rail 101 in a protruded state. A second voltage may be formed at an electrode 103*b* of the third side rail 103 in a protruded state. Here, a potential difference between the first voltage and the second voltage may be an operation voltage of the electronic device 200. Exemplarily, the first voltage may be 12V, and the second voltage may be GND.

The first side rail 101 and the third side rail 103 may display a color corresponding to the voltage formed in the protruded state. That is, the LED bar of the side rail may display a color according to the voltage formed at the corresponding electrode. The LED bar may display a first color corresponding to the first voltage and may display a second color, which is different from the first color, corresponding to the second voltage. The LED bar 101*c* of the first side rail 101 may display the first color corresponding to the first voltage, and the LED bar 103*c* of the third side rail 103 may display the second color corresponding to the second voltage. Here, the first color and the second color may be different from a color displayed by the LED bars of the remaining side rails that are not protruded. The LED bars of the remaining side rails that are not protruded may display a color that is the same as or similar to the color of the interior space of the vehicle in which the fixing device 100 is arranged. Through color display using the LED bar, checking the currently supplied voltage state may be supported.

FIG. 6 exemplarily illustrates a process of fixing an electronic device 200 of a size different from that of FIG. 5 to the fixing device 100. The electronic device 200 of FIG. 6 may be a device having a relatively longer length than the electronic device 200 of FIG. 5, and the distance between the first fixing member 201 and the second fixing member 202 may also be configured to be longer. In FIG. 6, the side rails corresponding to the first fixing member 201 and the second fixing member 202 may be the first side rail 101 and the fourth side rail 104, and the fixing of the electronic device 200 may be performed by using the first side rail 101 and the fourth side rail 104. Here, the use of the first side rail 101 and the fourth side rail 104 is merely one example. A combination of side rails that may be applied according to the size of the electronic device 200 may include the second and fifth side rails and the third and sixth side rails. Selection of the pair or set of side rails used for fixation may vary depending on a user's operation or recognition information from the body movement controller.

Figure 7:
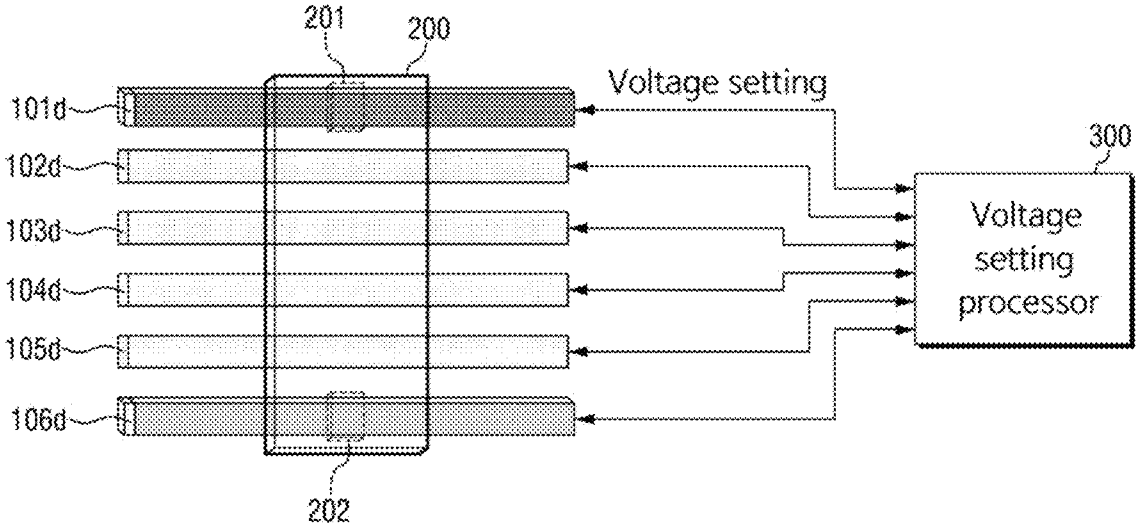
FIGS. 7 to 10 are exemplary diagrams for explaining an operation of a voltage setting processor according to an embodiment of the present disclosure.

Referring to FIG. 7, a voltage setting processor 300 may set voltages for the plurality of side rails. Here, the voltage setting processor 300 may determine whether each side rail is protruded, and in response to the protrusion of a side rail, may provide a voltage to the protruded side rail. In the example of FIG. 7, fixation of the electronic device 200 may be performed through the first side rail 101 and the sixth side rail 106. In response to the protruding movement of the first side rail 101, the voltage setting processor 300 may set a first voltage to an electrode of the first side rail 101. In response to the protruding movement of the sixth side rail 106, the voltage setting processor 300 may set a second voltage to an electrode of the sixth side rail 106. A potential difference between the first voltage and the second voltage may be an operation voltage of the electronic device 200, and operation power may be supplied to the electronic device 200 as a first fixing part and a second fixing part come into contact with the respective electrodes. In the example of FIG. 7, it can be seen that the first side rail 101 to which the first voltage is provided displays a first color, and the sixth side rail 106 to which the second voltage is provided displays a second color. When the protruded plurality of side rails are switched to a hidden state, that is, to a non-protruding state inside the vehicle, the voltage setting processor 300 may cut off the set voltages. In the example of FIG. 7, in response to the first side rail 101 being switched to a non-protruding state, the voltage setting processor 300 may cut off electrical connection with the electrode of the first side rail.

Here, the plurality of side rails may further include adjustment switches for controlling electrical connection with the voltage setting processor 300. The adjustment switch may be located at the terminal end of each of the plurality of side rails to support a user's physical operation, but is not limited thereto. In the example of FIG. 7, it can be seen that first to sixth adjustment switches 101*d* to 106*d* corresponding to first to sixth side rails 101 to 106 are arranged. The user may cut off or change the voltage provided from the voltage setting processor 300 by adjusting the adjustment switch. Exemplarily, through the first adjustment switch 101*d*, the user may cut off the voltage provided to the electrode of the first side rail or change the level of the voltage.

Figure 8:
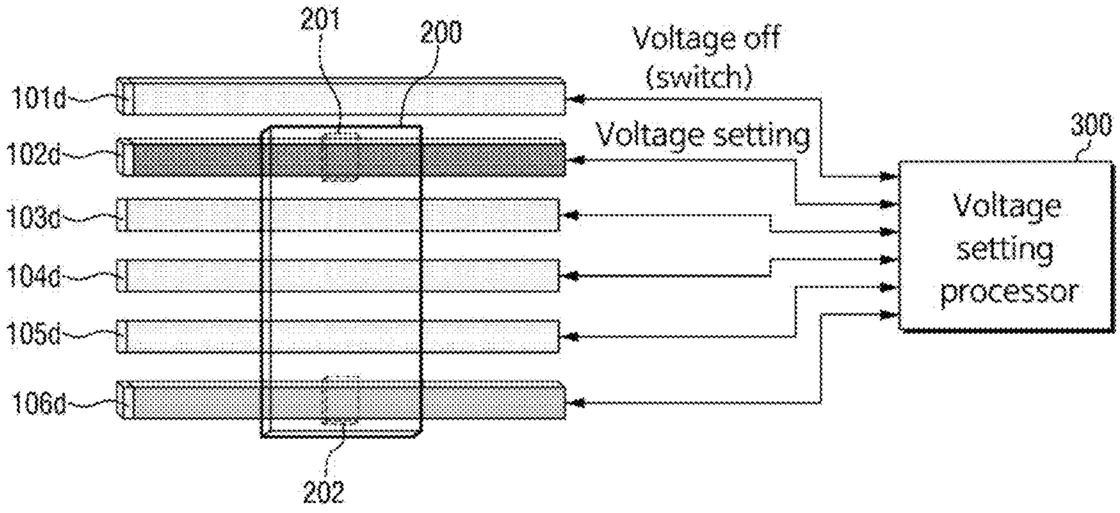

In the example of FIG. 8, the user may turn off the first voltage provided to the first side rail 101 through the first adjustment switch 101*d*. That is, the setting of the first voltage may be released even when the first side rail 101 is not in a hidden state. As the provision of the first voltage is cut off, the operation in which the first side rail 101 displays the first color may also be stopped. The user may switch the second side rail 102 to a protruded state in order to fix another electronic device of a different size or dimension to the fixing device 100, and in response to the protrusion of the second side rail 102, the voltage setting processor 300 may set the first voltage to the second side rail 102. The electronic device 200 may be fixed through the second side rail 102 and the sixth side rail 106, and may also receive operation power.

Figure 9:
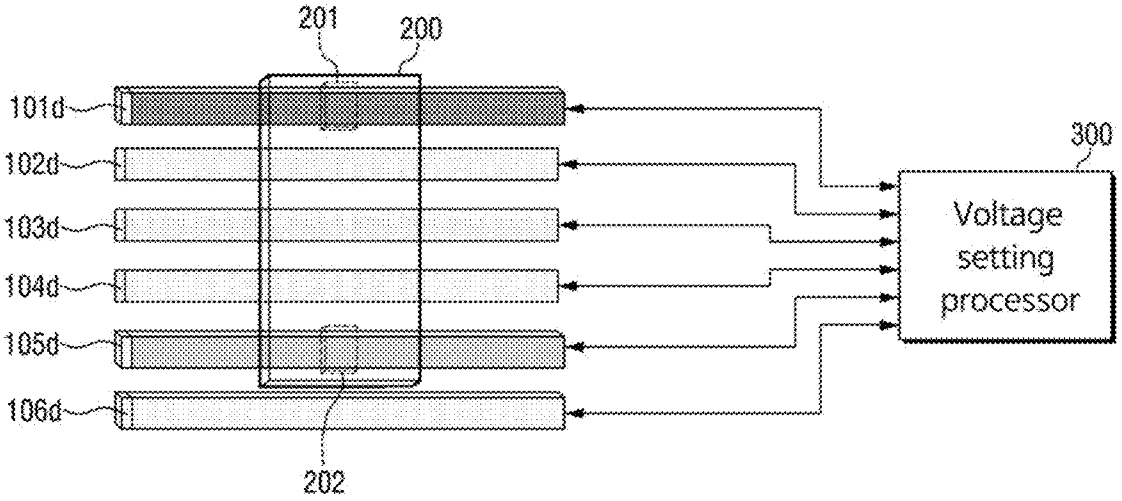

Referring to FIG. 9, the user may turn off the second voltage provided to the sixth side rail 106 through the sixth adjustment switch 106*d*. That is, the setting of the second voltage may be released even when the sixth side rail 106 is not in a hidden state. As the provision of the second voltage is cut off, the operation in which the sixth side rail 106 displays the second color may also be stopped. The user may switch the fifth side rail 105 to a protruded state in order to fix another electronic device of a different size or dimension to the fixing device 100, and in response to the protrusion of the fifth side rail 105, the voltage setting processor 300 may set the second voltage to the fifth side rail 105. The electronic device 200 may be fixed through the first side rail 101 and the fifth side rail 105, and may also receive operation power.

Figure 10:
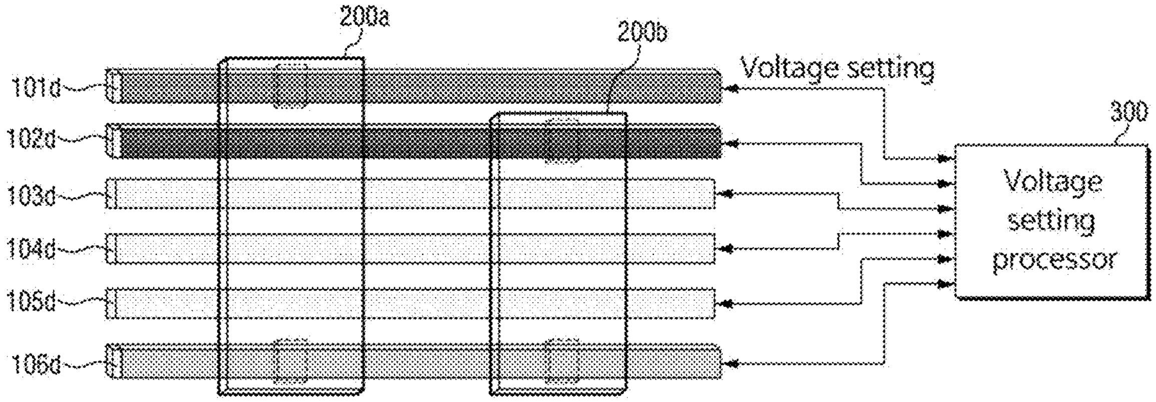

Referring to FIG. 10, the user may additionally fix a second electronic device 200*b* of a different size by protruding the second side rail 102 while the first electronic device 200*a* is fixed as shown in FIG. 7. Here, the second electronic device 200*b* may have an operation voltage different in magnitude from that of the first electronic device 200*a*, and a third voltage different from the first voltage may be provided to the second electronic device 200*b*. The second side rail 102 may display a third color corresponding to the third voltage to indicate the operating state.

In addition, in some embodiments, the voltage setting processor 300 may set a voltage to the corresponding side rail in response to a push operation of the adjustment switch.

In addition, the adjustment switch may be movable in four directions in addition to the push operation. The voltage setting processor 300 may set a voltage to a corresponding side rail according to the movement direction of the adjustment switch. Here, the four directions may refer to upward, downward, leftward, and rightward directions. With reference to the second switch 102*d* of the second side rail 102, movement in the upward direction may refer to movement toward adjacency with the first switch 101*d* of the first side rail 101. In response to the second switch 102*d* moving in the upward direction, the voltage setting processor 300 may set a voltage to the second side rail 102 that is the same as the voltage set to the first side rail 101. Also, movement in the downward direction with reference to the second switch 102*d* may refer to movement toward adjacency with the third switch 103*d* of the third side rail 103. In response to the second switch 102*d* moving in the downward direction, the voltage setting processor 300 may set a voltage to the third side rail 103 that is the same as the voltage set to the third switch 103*d* of the third side rail 103. The voltage setting processor 300 may change the voltage level in response to leftward or rightward movement of the adjustment switch. Exemplarily, leftward movement may be an operation for decreasing the voltage level, and rightward movement may be an operation for increasing the voltage level. Through such voltage setting using the adjustment switch, a user may more easily change or set the voltage of the electronic device fixed to the fixing device.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A fixing device for vehicle electronics, comprising:

a first side rail located in an interior space of a vehicle and to which a first voltage is provided; and a second side rail located in the interior space of the vehicle spaced apart from the first side rail and to which a second voltage different from the first voltage is provided, wherein the first side rail and the second side rail are arranged in parallel in one direction, the first side rail includes a first body part to which a first fixing member of a first electronic device is physically fixed and a first electrode to which the first voltage is provided, the second side rail includes a second body part to which a second fixing member of the first electronic device is physically fixed and a second electrode to which the second voltage is provided, the first fixing member comes into contact with the first electrode when fixed to the first body part, the second fixing member comes into contact with the second electrode when fixed to the second body part, the first fixing member and the second fixing member include a conductive material, and the first electronic device is operated based on a potential difference between the first voltage and the second voltage.

2. The fixing device for vehicle electronics according to claim 1, wherein the first side rail and the second side rail are accommodated in the interior space of the vehicle so as not to protrude in an unused state, and the first side rail and the second side rail are moved to protrude from the interior space of the vehicle in a usage state for fixing with the electronic device and supplying power to the electronic device to expose the first body part and the second body part to the outside.

3. The fixing device for vehicle electronics according to claim 2, wherein the first side rail further includes a first LED bar extending along a longitudinal direction of the first side rail, the second side rail further includes a second LED bar extending along a longitudinal direction of the second side rail, the first LED bar and the second LED bar are controlled to display a color or pattern similar to that of the interior space of the vehicle in the unused state, the first LED bar displays a first color corresponding to the first voltage in the usage state, and the second LED bar displays a second color corresponding to the second voltage in the usage state.

4. The fixing device for vehicle electronics according to claim 2, further comprising:

a voltage setting processor that provides the first voltage to the first side rail and provides the second voltage to the second side rail.

5. The fixing device for vehicle electronics according to claim 4, wherein the voltage setting processor sets the first voltage to the first electrode in response to the protruding movement of the first side rail and sets the second voltage to the second electrode in response to the protruding movement of the second side rail.

6. The fixing device for vehicle electronics according to claim 2, wherein the first side rail further includes a first adjustment switch that controls electrical connection with the voltage setting processor, the second side rail further includes a second adjustment switch that controls electrical connection with the voltage setting processor, a voltage set to the first electrode of the first side rail is changed according to an operation of the first adjustment switch, and a voltage set to the second electrode of the second side rail is changed according to an operation of the second adjustment switch.

7. The fixing device for vehicle electronics according to claim 1, further comprising:

a third side rail located around the first side rail or the second side rail, wherein the first side rail, the second side rail, and the third side rail are arranged in parallel in one direction.

8. The fixing device for vehicle electronics according to claim 7, wherein as the third side rail is moved to protrude, a third voltage is provided to a third electrode of the third side rail, a first fixing member of a second electronic device having a size different from the first electronic device is physically fixed to a third body part of the third side rail and comes into contact with the third electrode, a second fixing member of the second electronic device is physically fixed to a second body part of the second side rail and comes into contact with the second electrode, and the second electronic device is operated based on a potential difference between the third voltage and the second voltage while being coupled to the third side rail and the second side rail.

9. The fixing device for vehicle electronics according to claim 1, wherein the electronic device further comprises an elastic member disposed between the first fixing member and the second fixing member, and the first fixing member and the second fixing member receive the first side rail and the second side rail in a state in which a distance therebetween is temporarily increased by the elastic member, and are respectively coupled to the first body part of the first side rail and the second body part of the second side rail by a restoring force of the elastic member.

10. The fixing device for vehicle electronics according to claim 1, wherein the first body part of the first side rail and the second body part of the second side rail include both an upper coupling groove formed on an upper portion and a lower coupling groove formed on a lower portion, the first electrode is arranged to cover the upper coupling groove and the lower coupling groove of the first body part, and the second electrode is arranged to cover the upper coupling groove and the lower coupling groove of the second body part.

* * * * *